United States Patent
Shaburov et al.

(10) Patent No.: US 7,873,942 B2
(45) Date of Patent: Jan. 18, 2011

(54) DESIGN-TIME ARCHITECTURE FOR SELF-CONTAINED PATTERNS

(75) Inventors: Victor V. Shaburov, Leimen (DE); Ulf Fildebrandt, Oftersheim (DE); Markus Cherdron, Muehlhausen (DE); Vinay Nath Penmatsa, Bangalore (IN); Rachel Ebner, Raanana (IL); Frank Seeger, Wiesloch (DE); Peter Giese, Kaiserslautern (DE)

(73) Assignee: SAP AG, Walldorf (DE)

( * ) Notice: Subject to any disclaimer, the term of this patent is extended or adjusted under 35 U.S.C. 154(b) by 1113 days.

(21) Appl. No.: 11/591,722

(22) Filed: Nov. 1, 2006

(65) Prior Publication Data

US 2007/0168936 A1    Jul. 19, 2007

Related U.S. Application Data

(60) Provisional application No. 60/732,791, filed on Nov. 1, 2005.

(51) Int. Cl.
*G06F 9/44* (2006.01)
(52) U.S. Cl. .................. 717/109; 717/100; 717/113
(58) Field of Classification Search .................. 717/100, 717/104–113
See application file for complete search history.

(56) References Cited

U.S. PATENT DOCUMENTS

| | | | | |
|---|---|---|---|---|
| 5,850,548 A | * | 12/1998 | Williams | 717/107 |
| 6,526,566 B1 | * | 2/2003 | Austin | 717/109 |
| 7,412,658 B2 | * | 8/2008 | Gilboa | 715/762 |
| 7,464,373 B1 | * | 12/2008 | Yunt et al. | 717/125 |
| 7,689,917 B2 | * | 3/2010 | Washington et al. | 715/717 |
| 2004/0168155 A1 | * | 8/2004 | O'Farrell et al. | 717/129 |
| 2006/0064670 A1 | * | 3/2006 | Linebarger et al. | 717/106 |
| 2006/0150148 A1 | * | 7/2006 | Beckett et al. | 717/109 |

OTHER PUBLICATIONS

Kovari et al., "WebSphere Application Server Enterprise V5 and Programming Model Extensions WebSphere Handbook Series," Sep. 2, 2003, IBM Redbooks. Chapter 4.*
Ruvalcaba, "Macromedia Dreamweaver 8 Unleashed," Oct. 7, 2005, Sams, Chapter 15.*

* cited by examiner

*Primary Examiner*—Wei Y Zhen
*Assistant Examiner*—Chung Cheng
(74) *Attorney, Agent, or Firm*—Mintz, Levin, Cohn, Ferris, Glovsky & Popeo, P.C.

(57) ABSTRACT

A design-time architecture that allows for flexible creation of application programs is disclosed. A composer core generates displays of application components and application interfaces that define patterns of functions and interactions between interfaces. A pattern base kit tool may provide common logic for the application components. A repository stores the application components and interfaces during run-time.

11 Claims, 13 Drawing Sheets

DESIGN-TIME ARCHITECTURE FOR SELF-CONTAINED PATTERNS

RELATED APPLICATIONS

This application claims the priority of U.S. Provisional Application for Patent Ser. No. 60/732,791, filed Nov. 1, 2005, the disclosure of which is incorporated here in its entirety.

TECHNICAL FIELD

The subject matter disclosed herein relates to design-time architectures, such as those for creating application programs.

BACKGROUND

Application programs, sometimes referred to simply as applications, are programs that an end-user runs to accomplish certain tasks. Applications typically work in conjunction with one or more back-end systems, which store the data to be worked on, such as for example business objects and other business data, as well as logic for manipulating the data, such as for example transactions or other business logic. Examples of back-end systems may include database systems, enterprise resource planning (ERP) systems, and customer relationship management (CRM) systems. A user interface (UI) is designed to work in concert with application programs, and facilitates interaction between humans and computers by inviting and responding to user input.

One type of application is a network application, in which a network connects an application program running on a server and one or more user interfaces displayed in client programs running on client devices. The client/server relationship is one in which a server provides services to the client devices. Both the client devices and the server typically have a network interface for accessing networks such as for example a local area network (LAN), a wide area network (WAN), or the Internet.

In a network environment, an example of a client device is a personal computer, and an example of a client program is a web browser. The client program, which displays a user interface for an application running on a server, enables networked communication between the client device and the server using a data transfer protocol, such as for example the Hypertext Transfer Protocol (HTTP), to exchange files, images, programs, or application data. The information transmitted from the server and intended for display in the client program on the client device may be marked up with Hypertext Markup Language (HTML) code, Extensible Markup Language (XML) code, or the like.

SUMMARY

The details of one or more implementations are set forth in the accompanying drawings and the description below. Other features and advantages will be apparent from the description and drawings, and from the claims.

In one aspect, an application design-time architecture is provided that includes a visual composer core generates a display of application components and application interfaces. Each application component defines a pattern of predefined functions and each application interface includes a set of predefined interactions between pairs of the application interfaces. The design-time architecture also includes a pattern base kit tool that provides common logic for the predefined functions of each of the application components and a repository that stores the application components and the application interfaces. The repository may be accessed by the visual composer to generate a display of application components and application interfaces present between pairs of application components based on the common logic of the pattern base kit.

The application design-time architecture may optionally include a plurality of design time services that are accessible by the visual composer core. These additional services may be configured to implement roles and interfaces of the application using the application components and application interfaces. Additionally, a palette may optionally be provided by the visual composer. This palette may optionally include a number of generic design-time extensions for the pattern base kit tool.

The design-time architecture may also feature a visual composer core that is further configured to receive changes to the application components and application interfaces and optionally, a distribution mechanism that is under the direction of the visual composer core. The distribution mechanism distributes changes made to the application components and application interfaces to the repository. The distribution mechanism may optionally be further configured to propagate the changes to the pattern base kit tool.

In a second interrelated aspect, a computer program product operable to cause data processing apparatus to perform a number of operations may be tangibly embodied in an information carrier. The operations performed include generating a display of application components and application interfaces. Each application component defines a pattern of predefined functions and each application interface has a set of predefined interactions between pairs of the application interfaces. The computer program product also provides common logic for the predefined functions of each of the application components and stores the application components and the application interfaces in a repository. The repository is accessible to generate the display of application components and application interfaces between pairs of application components based on the common logic.

Optionally, the data processing apparatus may be further configured to perform operations comprising implementing roles and interfaces of the application using the application components and application interfaces. Additionally, the data processing apparatus may optionally be further configured to perform operations such as providing a palette to the display of application components and application interfaces. The palette may optionally include a number of generic design-time extensions for the common logic for the predefined functions of each of the application components.

The computer program product may also be configured to receive changes to the application components and application interfaces. Changes to the application components and application interfaces may optionally be distributed by the computer program product to the repository. Also, changes may be propagated to a pattern base kit tool that is configured to provide the common logic for the predefined functions of each of the application components.

In a third interrelated aspect, a computer-implemented method for designing an application may include generating a display of application components and application interfaces. Each application component defines a pattern of predefined functions and each application interface having a set of predefined interactions between pairs of the application interfaces. Common logic are provided for the predefined functions of each of the application components, and the application components and the application interfaces are stored in a repository which is accessible to generate the display of application components and application interfaces between pairs of application components based on the common logic.

BRIEF DESCRIPTION OF THE DRAWINGS

These and other aspects will now be described in detail with reference to the attached drawings, in which.

Like reference symbols in the various drawings indicate like elements.

DETAILED DESCRIPTION

Figure 1:
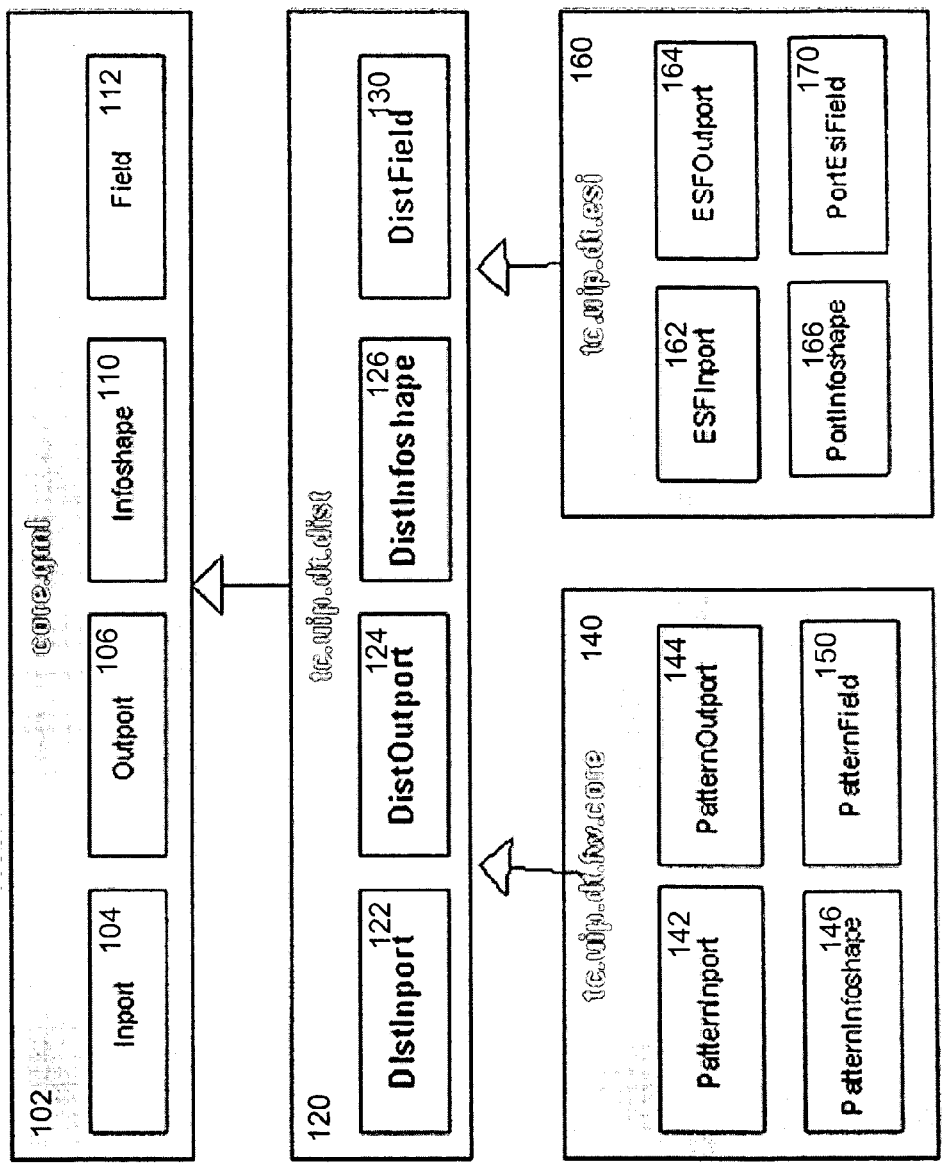
FIG. 1 is a diagram illustrating aspects of a distribution layer of the design-time architecture in accordance with an exemplary implementation.

A structured approach to developing applications typically includes a model-driven tool such as for example Visual Composer™, available from SAP (Waldorf, Del.). Model-driven tools allow a developer to compose applications in a flexible way by using patterns. A pattern graphically depicts functional components as drag-and-drop services, and a data flow definition between them. User interface patterns may be defined at various levels, and may be nested within each other, thus creating hierarchies of patterns. At the top level of the hierarchy, a pattern may act as a "floor plan" for a user interface that is designed to help end-users complete a specific business process or a specific application. The floor plan defines the user interface of the application by specifying an overall screen layout for the user interface and managing and orchestrating any nested patterns.

Current implementations of such pattern configurations typically involve strict separations of components related to data handling (service) and other component that are focused on user interactions (scenario). If a service element is changed, for example if a new attribute is created, this change is not propagated through the whole model because only service classes have awareness of backend meta data, such as for example business object node meta data. Implementation of the logic in the pattern components may not be a viable solution because this runs counter to the approach of modularizing each component. The distribution logic should be implemented in a more generic layer.

Use of pattern approaches facilitates creation of new composition units and the plugging in of these new components without changing already existing components. However a consequence of this approach is that existing components are not editable for new components. An abstraction layer defining that a specific component is designed to host one or more other components may be needed. This abstraction layer should not make any assumptions about the used components, because each component that is used is added in a dynamic way.

Various aspects of methods, techniques, and articles associated with a design-time architecture that packages runtime, generation time, and design-time implementations in a development unit for creating self-contained application composition units are disclosed herein. These design-time architectures generally operate by developing composition units independently of other composition units. Composition units may be dynamically plugged into any application development environment, such as for example a model driven tool like the Visual Composer™ tool, without requiring changes in any of the underlying frameworks.

As disclosed herein, various types of kits may be presented in a design-time architecture storyboard that are used for different purposes. This structure makes model creation dialog more logical as there need be only one model type to select from. Selection/unselection of features no longer must be related to a kit implementing a specific pattern's internal functionality, but rather each extension kit represents a set of features and constraints as a whole, which can either be enabled or disabled. Also, only kits imported by an extension kit are loaded, so unselection of a feature which could lead to inconsistencies is prevented because the appropriate kit is not loaded. In general, a pattern base kit is introduced as a dedicated kit providing services only to pattern kits. An infrastructure kit is also a dedicated kit providing services to any other kit, even kits outside of the pattern group.

To make the pattern configuration as generic as possible, a distribution mechanism may be implemented as part of the pattern infrastructure kit. Elements in the model may be linked to each other by links and/or ports. Ports hold infoshapes that contain the data (fields). When the content of the infoshape of a port is changed, the changes may be distributed to all elements connected to that port. Ports may be configured to receive the new infoshape, update their own infoshape, notify elements about the change, and/or forward the distributed infoshape to all relevant elements.

FIG. 1 is a block diagram of an example of a design time architecture 100. As shown, this design time architecture includes a core services class 102 that includes a core import class 104 and a core outport class 106 for exchanging core infoshape classes 110 and core fields 112. Also shown is a distribution layer 120 that includes distribution layer import classes 122 and distribution layer outport classes 124 for exchanging distribution layer infoshape classes 126 and distribution layer fields 130. The distribution layer also communicates with a pattern base kit 140 and an ESF internal kit 160. The pattern base kit 140 includes pattern base kit import classes 142 and outport classes 144 for exchanging pattern base kit infoshape classes 146 and pattern base kit fields 150, while the ESF internal kit 160 includes ESF kit import classes 162 and outport classes 164 for exchanging ESF kit infoshape classes 166 and ESF kit fields 170. Infrastructure kit classes may be modified to support the distribution mechanism. The distribution logic is implemented in the distribution layer import 122 and outport 124 classes. For example, the logic of the core class infoshape 110 copying is implemented in the distribution layer infoshape 126.

When a basic behavior is not needed, it may be overridden with another behavior. In one example, this overwriting may be accomplished in accordance with one of two methods. A method, such as for example distributeInfoshape, may be used where the basic port classes contain the distribution logic. A callback method, such as for example onDistributeInfoshape, may be implemented by classes that generate notification about the infoshape update and that may be overridden in the pattern kits.

A pattern may have multiple usages in the model, and patterns need not be updated more than once. In one implementation, a flag may be generated and kept for each pattern instance to inform whether it was updated or not. In this example, when the distribution process reaches a pattern, the pattern is flagged as updated. When the distribution iteration finishes, the flags are cleared. There is no common base class for PatternInport and PatternOutport interfaces. Therefore, repeating code may be contained in a helper class, and may be invoked by the port classes if needed. The distribution will take place for scenarios only, and not services, since services create their own data.

In one implementation of the subject matter disclosed herein, the disclosed design-time architectures include a composer tool, such as for example a visual composer core, a pattern base kit tool, and a repository. In one example, the visual composer core may be configured to generate a display of application components and application interfaces. An application component defines a pattern of predefined functions while an application interface participates in predefined interactions with other application interfaces.

Figure 2:
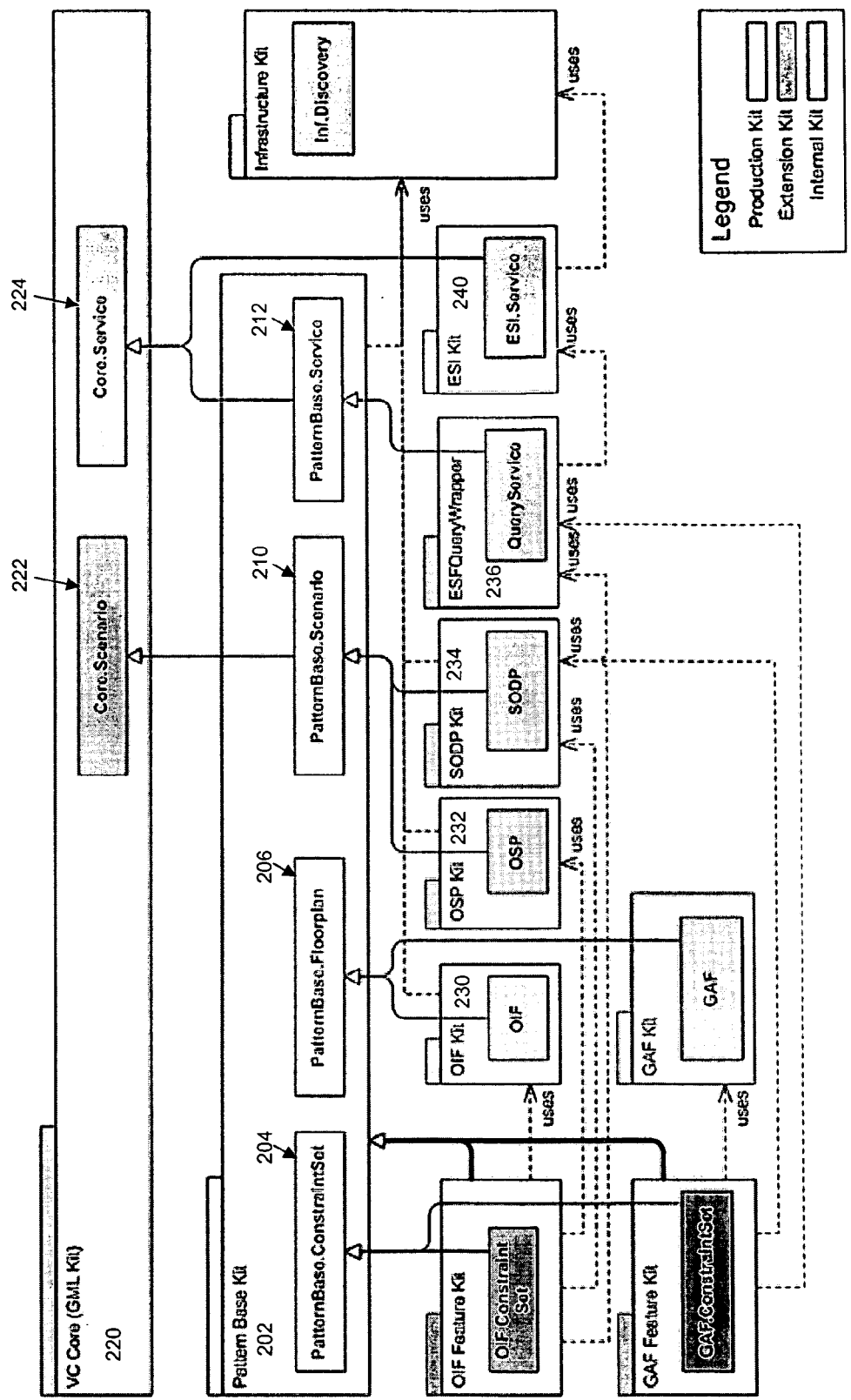
FIG. 2 is a diagram illustrating aspects of an example of a kit structure and dependencies among various types of kits.

In the example of a virtual composer 200 shown in FIG. 2, an OIF feature extension kit 260 and a GAF feature extension kit 262 are provided. The OIF feature extension kit 260 provides an OIF constraint set 264 for the OIF internal kit, while the GAF feature extension kit 262 provides a GAF constraint set 266 for the GAF internal kit. If features are to be deployed individually, extension kits should be defined in separate design classes, which do not contain any internal kits. Extension kits are extensions of the kits that contain the actual logic. As such, an internal kit may be used many times by different extension kits. Dependencies between kits are declared, and conventions are included to prevent implicit dependencies, such as for example reacting to an event of a kit, to which no dependency has been modeled. Constraints may also belong to extension kits. An extension kit may be defined for each floorplan as a constraint kit.

FIG. 2 is a relationship diagram of an example implementation of a virtual composer 200 as disclosed herein. The diagram illustrates possible dependencies between various types of kits in the virtual composer 200. Extension kits group a set of functionalities, called features. If a new feature is provided by a pattern, such as a new floorplan, a new extension kit may be implemented. Production kits are kits that represent a model type in the model creation dialog in the virtual composer. A model type may exist for modeling of composed patterns. In this example, a pattern base kit 202 is provided as a type of production kit. The pattern base kit 202 is responsible for delegating event handling to the current diagram in the storyboard, and it may include several sub kits, including a pattern base constraint kit 204, a pattern base floorplan kit 206, a pattern base scenario kit 210, and a pattern base service kit 212. Once a model type is selected in the model creation dialog, a list of features, such as for example one or more extension kits of the selected production kit, is displayed for selection. A user may then specify a list of features to use, without directly referencing the internal kits.

As further illustrated in FIG. 2, the virtual composer 200 also includes a VC core internal kit 220 that includes the virtual composer core. Internal kits, which are created in the markup language that creates the virtual composer contain constraints that are to be reused in different model types. In one example, this may be the Generalized Markup Language (GML) available from SAP. The VC core internal kit 220 in the virtual composer 200 shown in FIG. 2 includes a core scenario kit 222 that coordinates with the pattern base scenario kit 210 to implement components necessary to execute the virtual composer scenario and a core service kit 224 that coordinates with the pattern base service kit 212 to provide virtual composer services. Also included in the illustrative virtual composer 200 are additional internal kits including an OIF internal kit 230, an OSP internal kit 232, an SODP internal kit 234, an ESF query wrapper internal kit 236, an ESI service internal kit 240, and a GAF internal kit 242.

Figure 3:
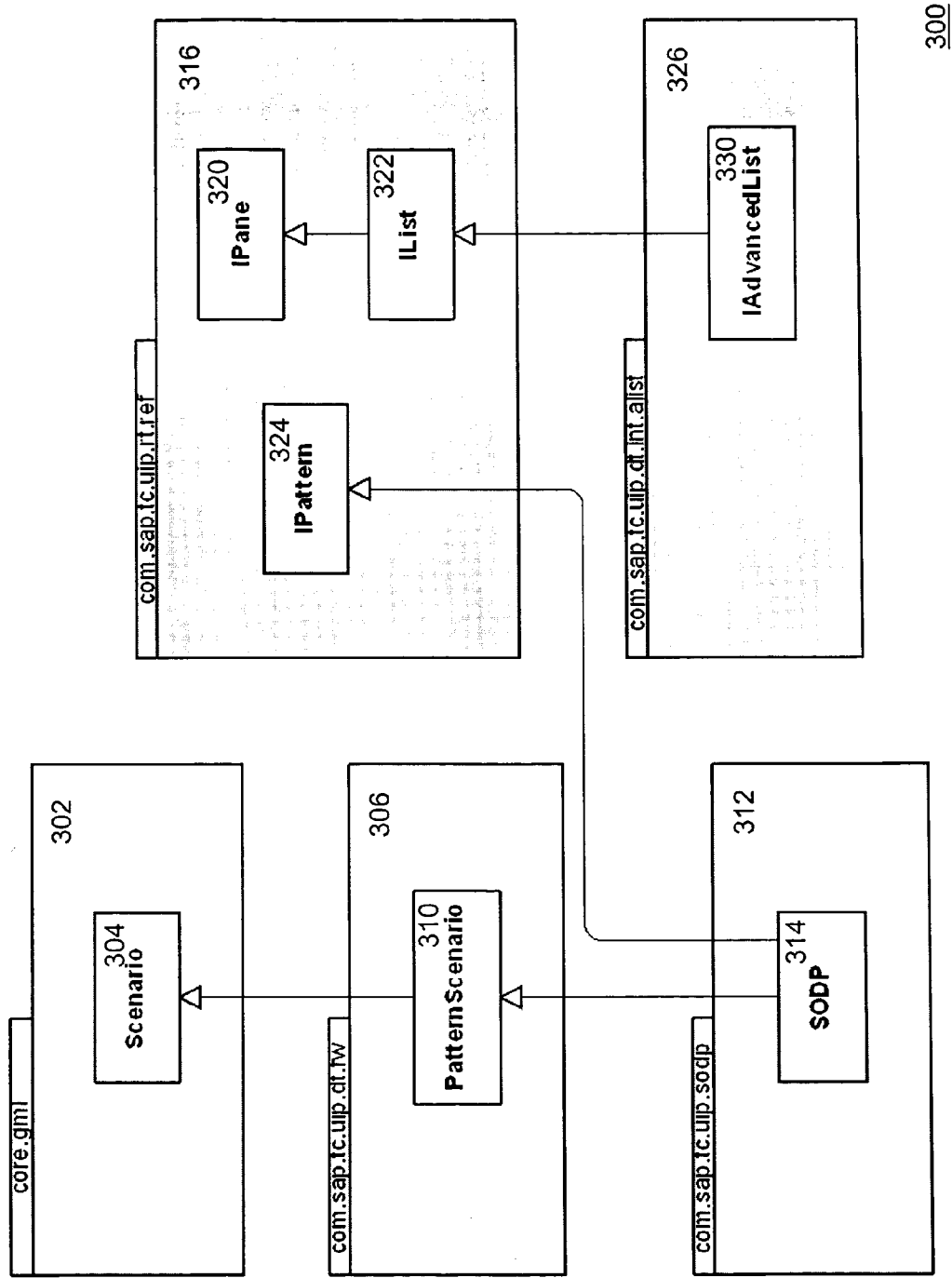
FIG. 3 is a diagram illustrating aspects of a design-time architecture having several levels of abstraction.

FIG. 3 is an interface diagram illustrating an example implementation of a virtual composer 300 based on a design-time architecture having several levels of abstraction. A core classes package 302 may contain one or more base classes, which may be implemented in the composition language in which the design-time architecture is implemented. In the example shown in FIG. 3, a scenario base class 304 is implemented in the core classes package 302. A pattern base classes package 306 may contain functionality that is common to pattern components, such as in this example a pattern scenario pattern class 310. One or more composition unit classes packages 312 may contain specific functionality for a pattern component, such as in this example for the pattern component SODP 314.

In a further implementation, the composer core may be configured to generate displays of application components and interfaces. It may also further be configured to receive changes to the application components and interfaces. The interface concept is a basic idea that facilitates introduction of new composition units. Normal inheritance dependencies between classes remain. For example, an SODP is a subclass of the markup language class scenario, however additional pattern components also implement some specific interfaces. Other packages may also contain interfaces. A core interfaces package 316 may contain interfaces that correspond directly to the runtime interfaces. For example, if there is an interface IPane, then the runtime also defines the interface IPane 320. Likewise, in the example implementation shown in FIG. 3, the runtime defines interfaces IList 322 and IPattern 124. A design-time interfaces package 326 may contain one or more interfaces used only during design-time. Design-time interfaces may inherit from the base interfaces. The example architecture shown in FIG. 3 includes the design-time interface IAdvancedList 330. Interfaces may be designed without any superinterface.

In general, pattern kits override only callback methods, such that event listeners are not distributed across kits. Only the appropriate code is executed so that control is maintained. For example, a listener such as onInsertElement may be defined in a kit. In this listener, a method onInsertElement may be called on the current diagram passing the event object ($ENV.contextDiagram.onInsertElement(event)). In the pattern kits, scenarios should implement the method onInsertElement and do the required processing with the event passed.

Figure 4:
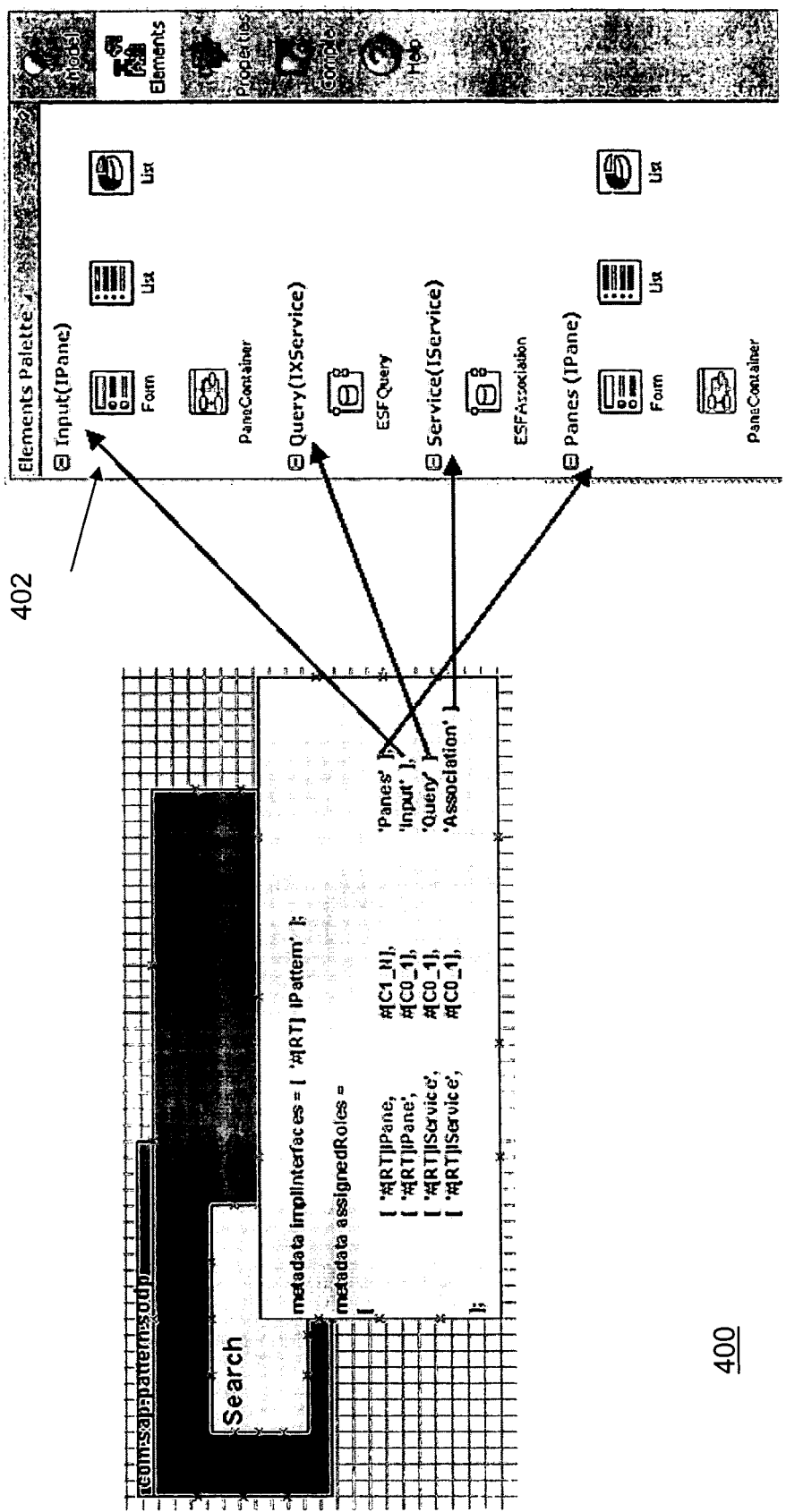
FIG. 4 is a diagram illustrating aspects of an example of a technique for using interfaces and roles in the palette.

In various implementations, a virtual composer core may also provide a palette. In one example, this palette may further include one or more generic design-time extensions that may be used by the pattern base kit tool. To create the elements in the palette, the information in the component may be analyzed, particularly the content of the assigned roles. As illustrated in the example implementation shown in FIG. 4, each assigned role is assigned an additional component group 400 in the palette 402. The elements that belong to this component group 400 may be identified by the implemented interfaces. If, for example, one role is defined to add only components that implement the interface IPane, then the design-time architecture determines whether every possible component implements this interface. If yes, then the component is added to the component group 400.

Groups in a palette may be created based on the information about the assigned roles. For example, if an interface IPane is allowed as the runtime interfaces Panes and AdvancedList, there may be two groups: Panes and AdvancedList. If an element from the role group AdvancedList is dropped, the create method may receive this information and assign the role "AdvancedList" to it.

In another implementation, the disclosed design-time architecture may include design time services that are accessible by the composer core. The design-time services may be configured to use application components and interfaces to implement roles and interfaces of the application.

Some implementations of the disclosed design-time architecture may also include a distribution mechanism that operates under direction of the composer core to distribute changes made in the application components and application interfaces to the repository. Some implementations may configure the distribution mechanism to also propagate changes made to the application components and application interfaces to the pattern base kit tool.

Role information in conventional systems generally includes only metadata information in a markup language implementation. It is also persisted in the model for a usage or an interactor, so it is available for the specific generators during generation on the server. However, there is may be no place where the information about assigned roles may be accessed on the server. The design-time architecture disclosed herein provides for communication about role information between the virtual composer and the server by distributing changes dynamically.

Figure 5:
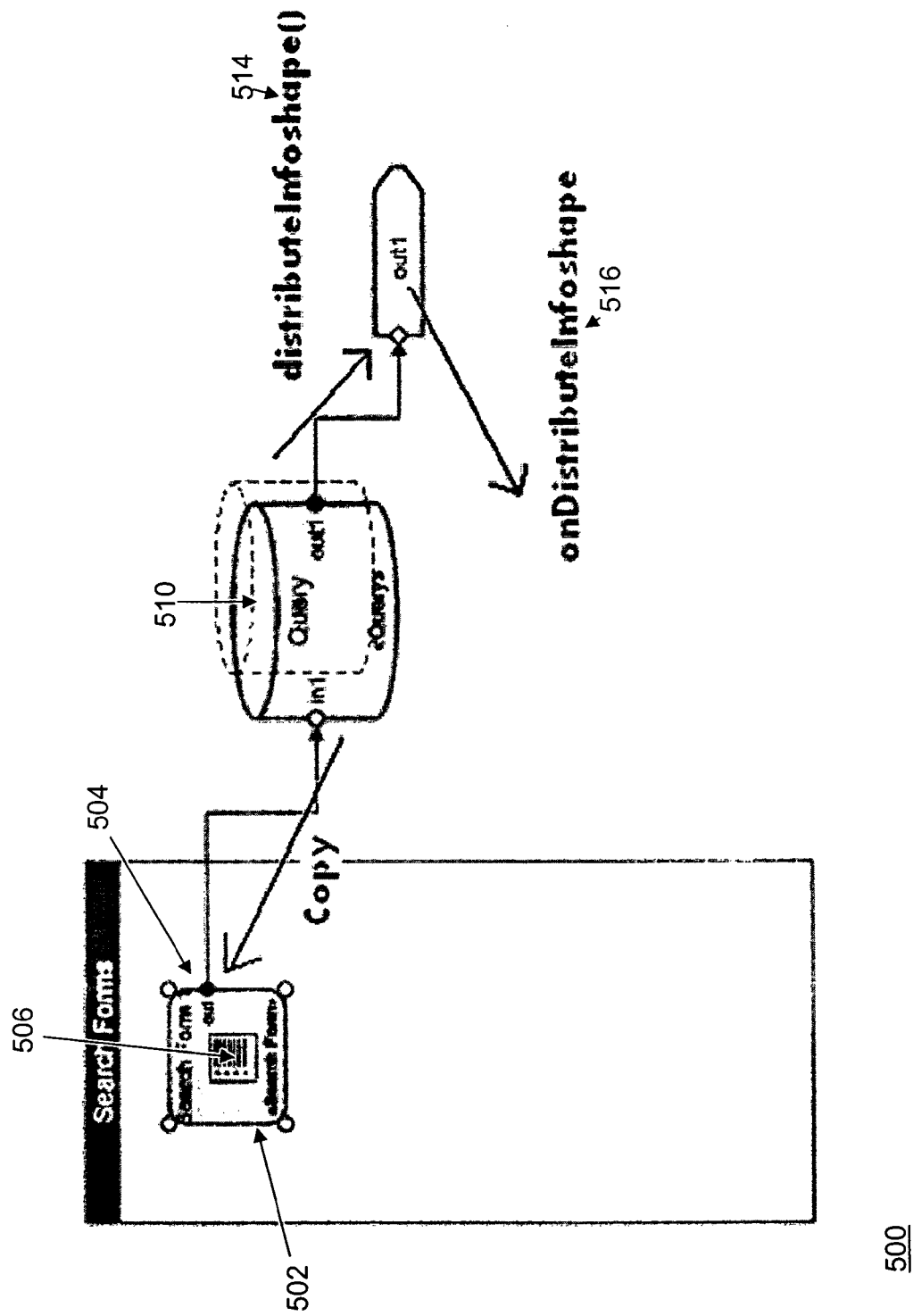
FIG. 5 is a first process flow diagram (of six) illustrating aspects of an example of a method for distributing changes in the design-time architecture for building applications.

FIGS. 5-10 are a series of process diagrams 500, 600, 700, 800, 900, 1000 that illustrate an example of such a method for distributing changes. FIG. 5 shows a diagram 500 illustrating a first step to change the query of a service element. A search form 502 provides an output 504 based on the entered search 506. This output is used to query the repository 510 and resultant data are propagated to the outport 512 of the diagram and the infoshape is updated by calling the method distributeInfoshape 514. Next, the changes may be propagated to the unit itself using a callback method, in this example onDistributeInfoshape 516, on the parent diagram. The consequence is that the implementation does all of the required changes, such as for example by updating the elements that are connected to the inports of the service element, because the distribution algorithm works normally only in the direction of the links.

Figure 6:
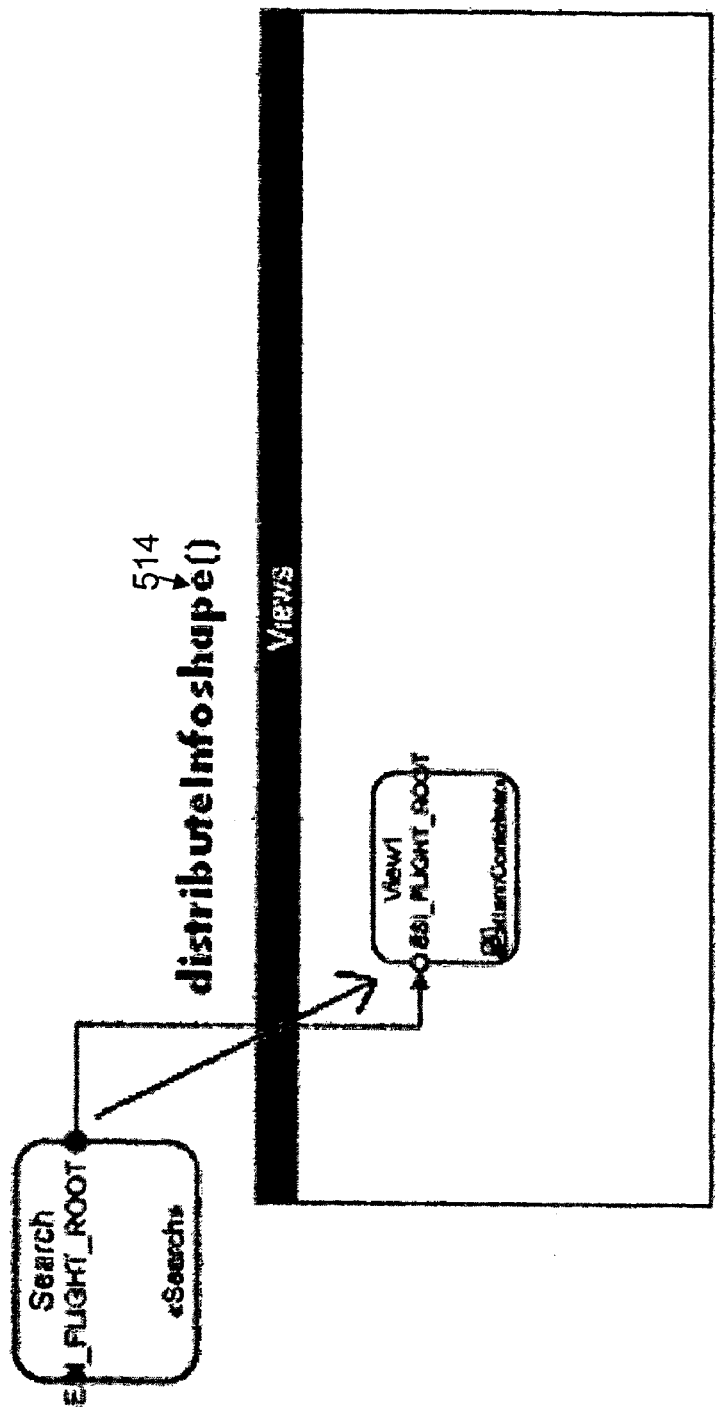
FIG. 6 is a second process flow diagram (of six) illustrating aspects of an example of a method for distributing changes in the design-time architecture for building applications.

The diagram 600 of FIG. 6 shows the change being distributed to other scenarios. Here, the change of the infoshape of the outport is also distributed to the inports of all other connected scenarios. This may be accomplished by invoking the method distributeInfoshape 514 on the ports of the connected scenarios.

Figure 7:
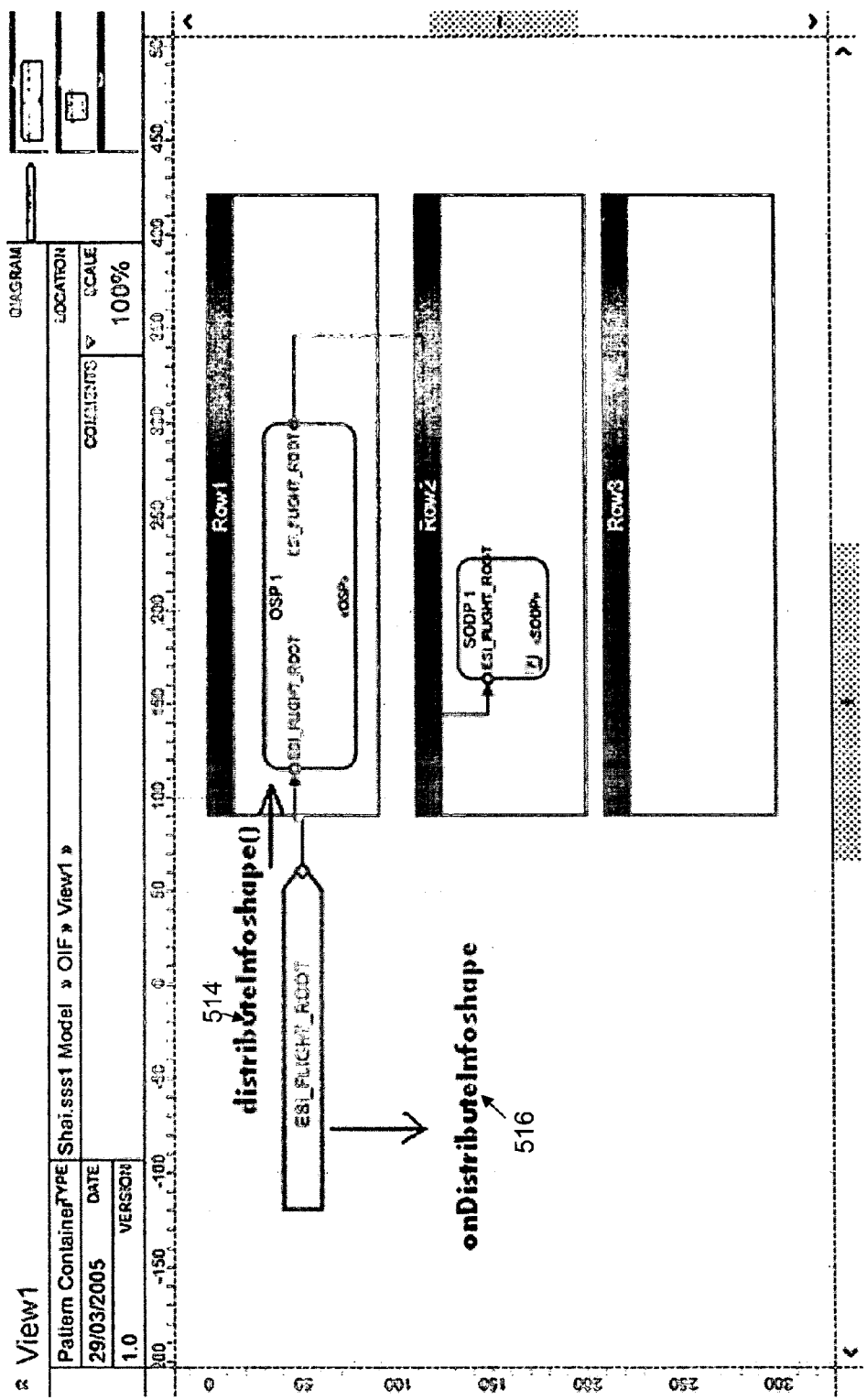
FIG. 7 is a third process flow diagram (of six) illustrating aspects of an example of a method for distributing changes in the design-time architecture for building applications.

In FIG. 7 the diagram 700 illustrates the change being distributed to all inner components. The implementation of the import calls the method distributeInfoshape 514 on all connected inports of components. Next, the callback method onDistributeInfoshape 516 is called.

Figure 8:
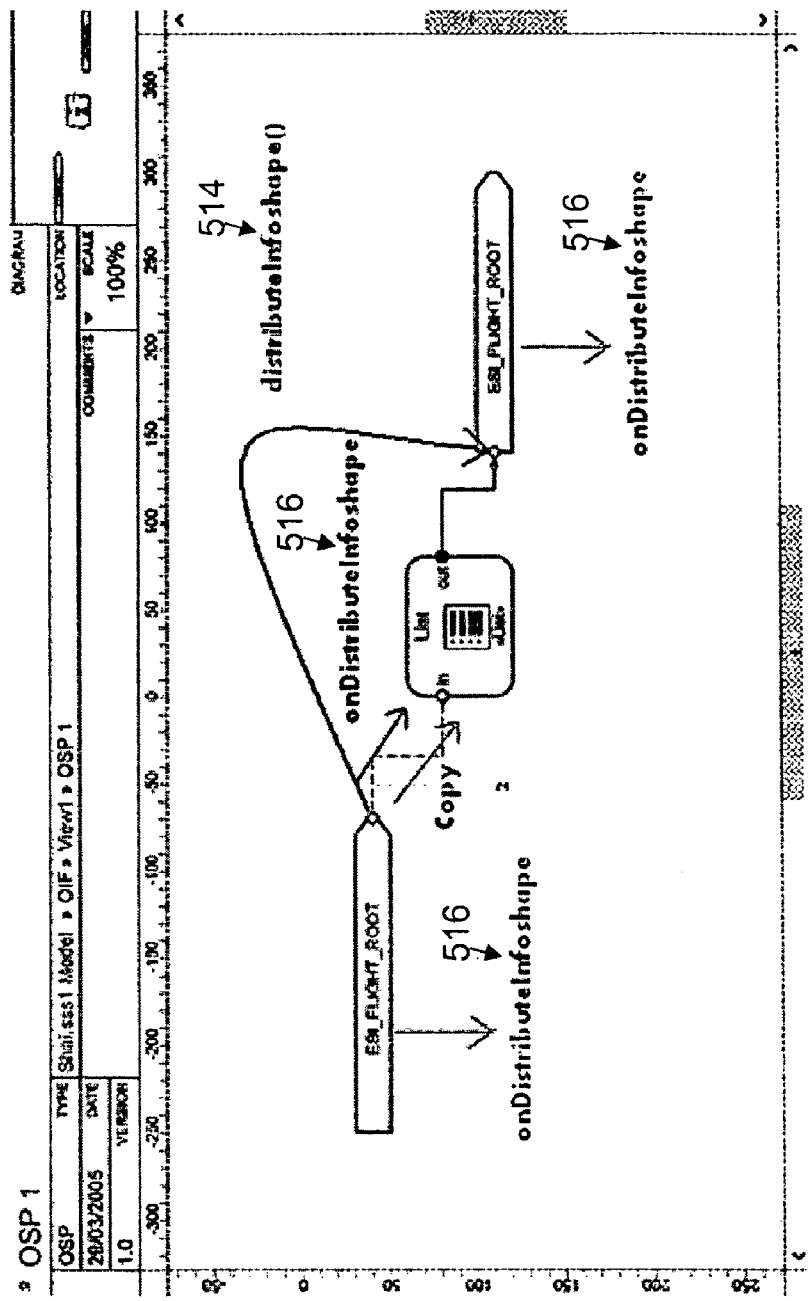
FIG. 8 is a fourth process flow diagram (of six) illustrating aspects of an example of a method for distributing changes in the design-time architecture for building applications.
Figure 9:
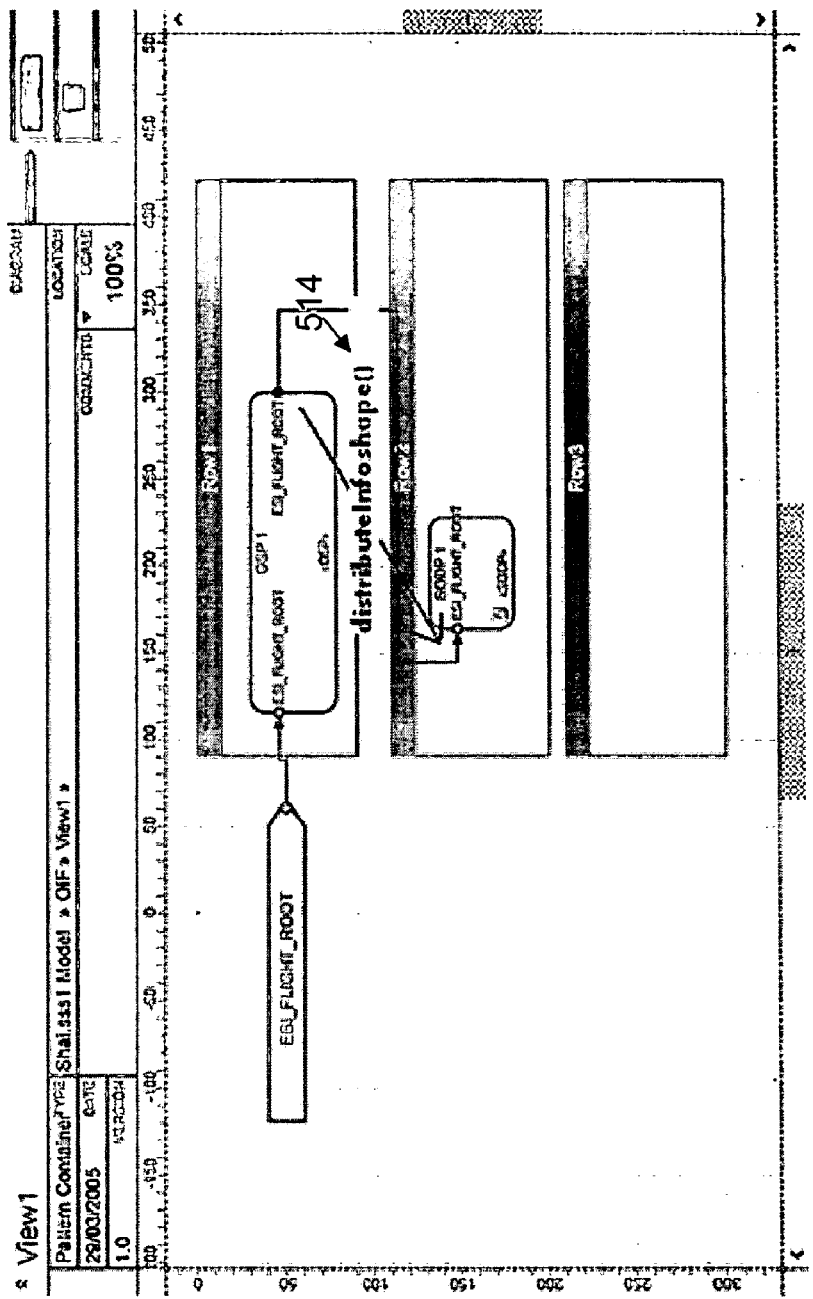
FIG. 9 is a fifth process flow diagram (of six) illustrating aspects of an example of a method for distributing changes in the design-time architecture for building applications
Figure 10:
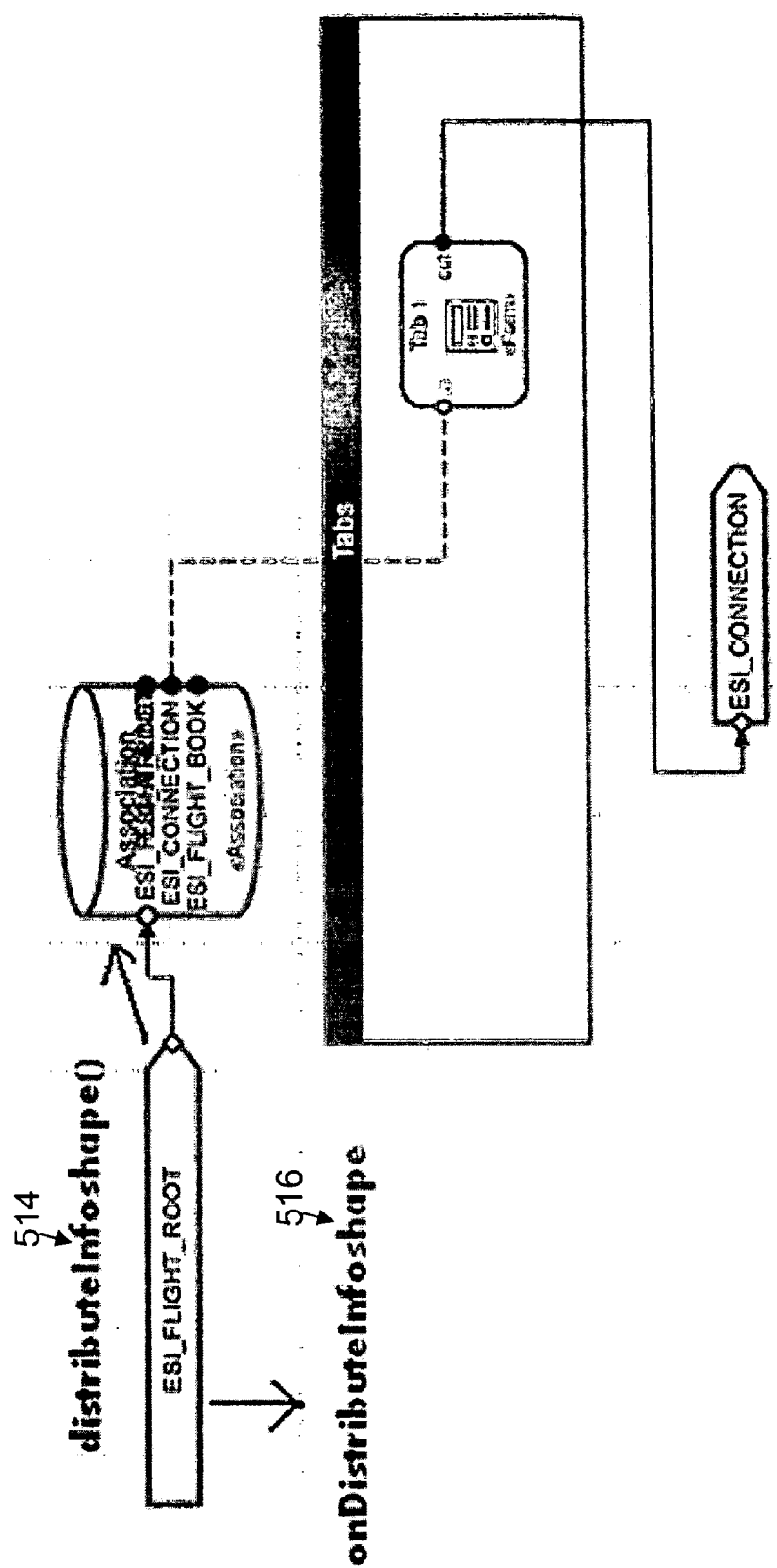
FIG. 10 is a sixth process flow diagram (of six) illustrating aspects of an example of a method for distributing changes in the design-time architecture for building applications.

FIG. 8 presents a diagram 800 that illustrates the change being distributed through the whole diagram. The method distributeInfoshape 514 is called on the import of all connected scenarios. The diagram 900 in FIG. 9 illustrates the change being distributed to other scenarios. Finally, the diagram 1000 in FIG. 10 illustrates the end of the distribution, where the change reaches the import. The method distributeInfoshape 514 is called for every connected import, as well as the callback method onDistributeInfoshape 516 if it is defined on the parent. However, because the distribution has reached a service element, the distribution stops. Once implemented, the service element decides whether or not a new distribution starts.

The markup language used to implement a virtual composer using aspects of the presently disclosed design time architecture may be used to define prototypes, but the prototypes generally cannot define new properties. The prototypes can be attached to classes, although many interfaces can be attached to one class. In the markup language, it is generally possible to define new properties that belong to a prototype. These properties are also available at the implementing class. Thus, prototypes in the pattern kit architecture define some methods as well as being marker interfaces.

A configuration model class may be provided to the infrastructure on the server for each new class in the markup language. Thus, each class in the markup language corresponds to a configuration model class. In the configuration model, each prototype in the markup language corresponds directly to an interface definition in the configuration model. Interfaces defined in a configuration model may be added to a model class. In one example, a class Form is a subclass of Interactor. Therefore, a configuration model may exist that contains a class Form. The Form interactor also implements the prototype IList in the markup language. Consequently, a configuration model may define this interface, and the configuration model class Form may implement the interface IList.

Pattern components may also use other components. A floor plan component hosts other components and provides a common framework for other pattern components. Many components can be reused. In some cases, a component uses two instances of the same component for different roles. For example, a form component may be used two times in a search component. In this example, the first instance may be used as a simple search form and the second instance may be used as an advanced search. Accordingly, a role is the behavior of an element in the pattern that is determined by the context of the pattern, and not by the internal behavior of the element itself. Thus, a component may be used by other components or component interfaces, and the same component may be defined for different uses. Thus, at runtime two instances of the same component are created and may be used in a completely different way.

To define a specific role for a pattern component, additional information is needed for every entity in the markup language. The additional information is added to the component itself, based on the kind of component needed. Interfaces may also be used to define which components may be used inside another component. The additional information may include information such as a cardinality, which may be added to the metadata.

Figure 11:
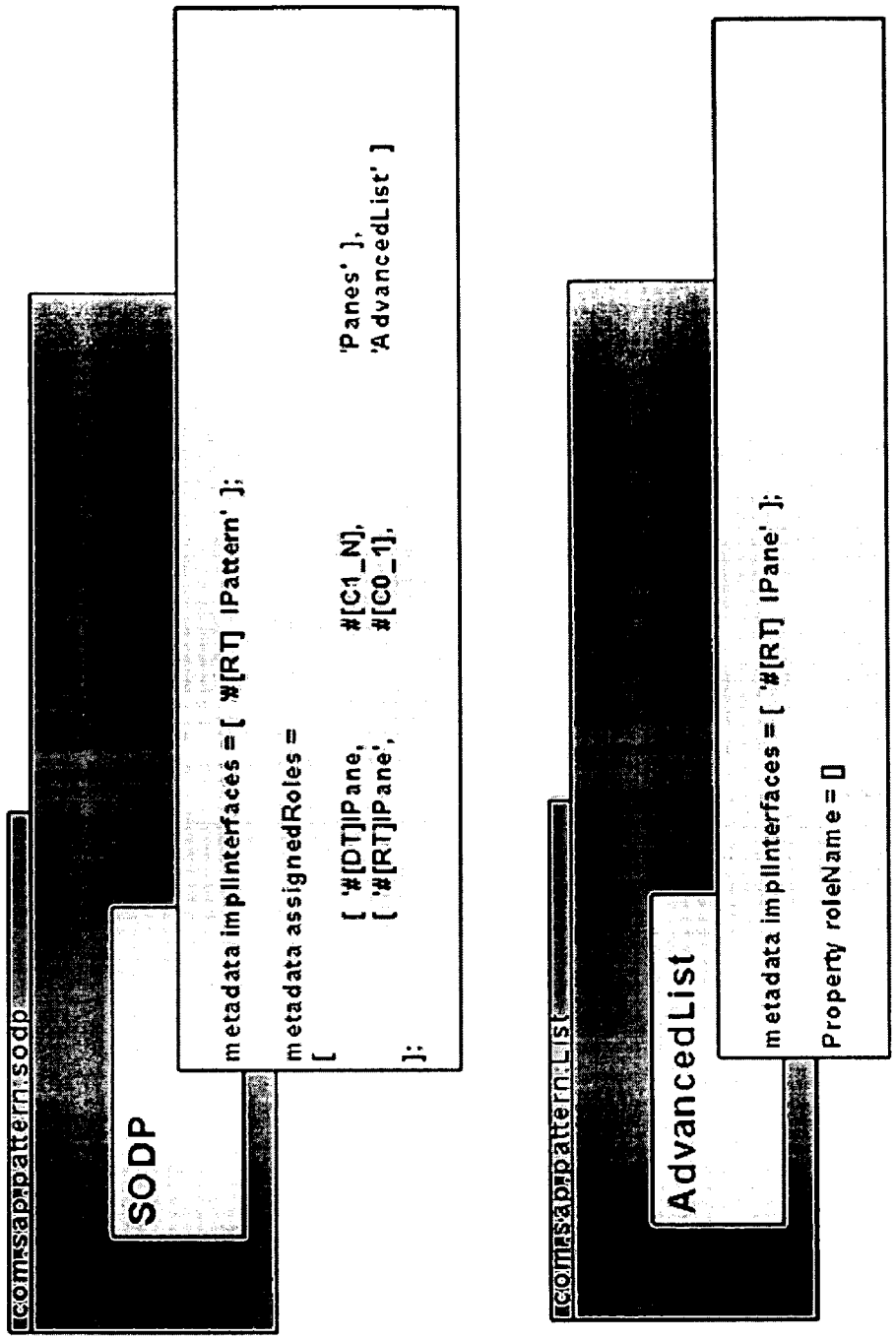
FIG. 11 is a diagram illustrating aspects of an example of a role and interfaces.

FIG. 11 is a diagram 1100 that illustrates an example of the interplay between roles and interfaces. The class SODP defines a property, in this example assignedRoles, for example using the metadata keyword of the markup language (in this example GML), and this information is available to all instances of the class. In this example, the class SODP defines two roles: one is named "Panes" and references the corresponding runtime interface IPane; the other is named "Advanced List" and references the design-time interface IAdvancedList. Cardinality is also defined. The role "Panes" has the cardinality 0 . . . n, so that any arbitrary number of components may be added to the SODP if the component implements the interface IPane. In this example, the role "AdvancedList" has the cardinality 0 . . . 1, and only one component may be added that implements the interface IAdvancedList.

A prototype in the markup language may be provided for every interface that is defined in the array of assigned roles. The classes SODP and AdvancedList both implement some prototypes. A class may implement many interfaces. For example, the class AdvancedList implements the interface IAdvancedList. In the class SODP there is one assignedRole that directly references the interface IAdvancedList.

Normally, if the classes in the markup language directly corresponds to the runtime components, called 1:1 mapping, then the assigned roles map to the component used in the runtime component with the cardinalities. This is a first level of constraint checks. The runtime constraints are defined by this mechanism. But it is also possible to directly define additional design-time-only constraints with pure design-time interfaces such as IAdvancedList.

In one example model, the role may be set at different places. For instance, the role information may be part of an interactor. For a component, on the other hand, the role information may be set on the instance of the class usage. This means that the role information is related to the usage of a component and not to the component itself One component may be used differently with different roles.

There are also many ways to set the role name for the concrete usages in a model. For a predefined pattern, in the method onCreate all role properties may be set. If the user decides to substitute one element for another, the pattern may receive the role of the original element. For wizards, which are used to define what element should be displayed where, when the role is defined, the pattern sets the role property. For state elements for different areas, a state may be similar to a placeholder and the implemented interface information may define what element can be dropped in the associated pattern component.

In an implementation of the design-time architecture as disclosed herein, the only information needed for a metadata definition is a descriptor that defines which generator is responsible for a specific component in the markup language. The descriptor file belongs to a kit, so there may be a single descriptor file for every kit. As noted above, various types of kits may be implemented in a design-time architecture as disclosed herein. During deployment the descriptor file may be stored on the DevServer. A simple example of a descriptor file follows:

```
<Generator>
  <GML>
    <Package>com.sap.gml.model</Package>
    <Kit>mtkit</Kit>
  </GML>
  <Generator-Description>
    <Default generatorClass="DefaultGenerator"/>
    <Class gmlClass="OIF" generatorClass="Generator"/>
    <Class gmlClass="OIFInfoshape"
      generatorClass="InfoShapeGenerator"/>
  </Generator-Description>
</Generator>
```

Design-time architectures disclosed herein may include a number of pattern design-time services that use the roles and interface concept to build generic implementations for pattern extension points, such as palette elements, QuickConnect menu entries, canCreateElement and canRemoveElement extension points, onCreateElement and onRemoveElement extension points, and wizards and custom dialog boxes.

Figure 12:
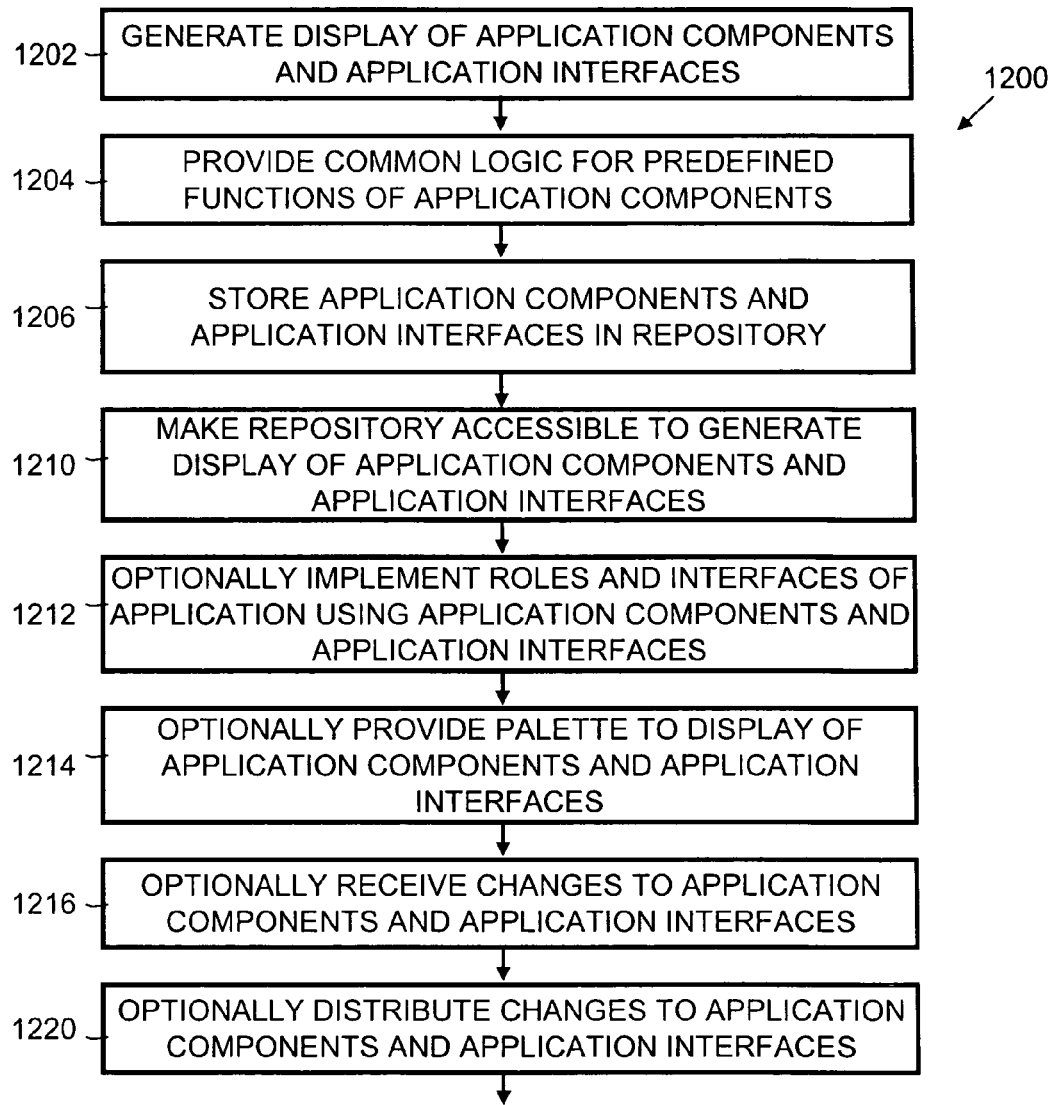
FIG. 12 is a process flow diagram illustrating an example of a method for implementing a design-time architecture.

In one implementation of the subject matter disclosed here an application may be designed. FIG. 12 provides a process flow chart 1200 illustrating various aspects of such a method. In this example, a display of application components and application interfaces is generated 1202. Each application component may define a pattern of predefined functions, while each application interface may have a set of predefined interactions specific to each potential pairing between it and other application interfaces. Common logic for the predefined application component functions is provided 1204. The application components and the application interfaces are stored in a repository 1206. The repository may be accessible to facilitate generation, based on the common logic, of displays of the application components and the application interfaces between pairs of application components 1210.

In optional implementations of the subject matter, roles and interfaces of the application may be implemented using the application components and the application interfaces 1212. In another option, a palette may be provided to facilitate display of the application components and the application interfaces 1214. Additionally, changes to the application components and the application interfaces may be received 1216, and the received changes, or alternatively, other changes, to the application components and the application interfaces may be distributed 1220.

Figure 13:
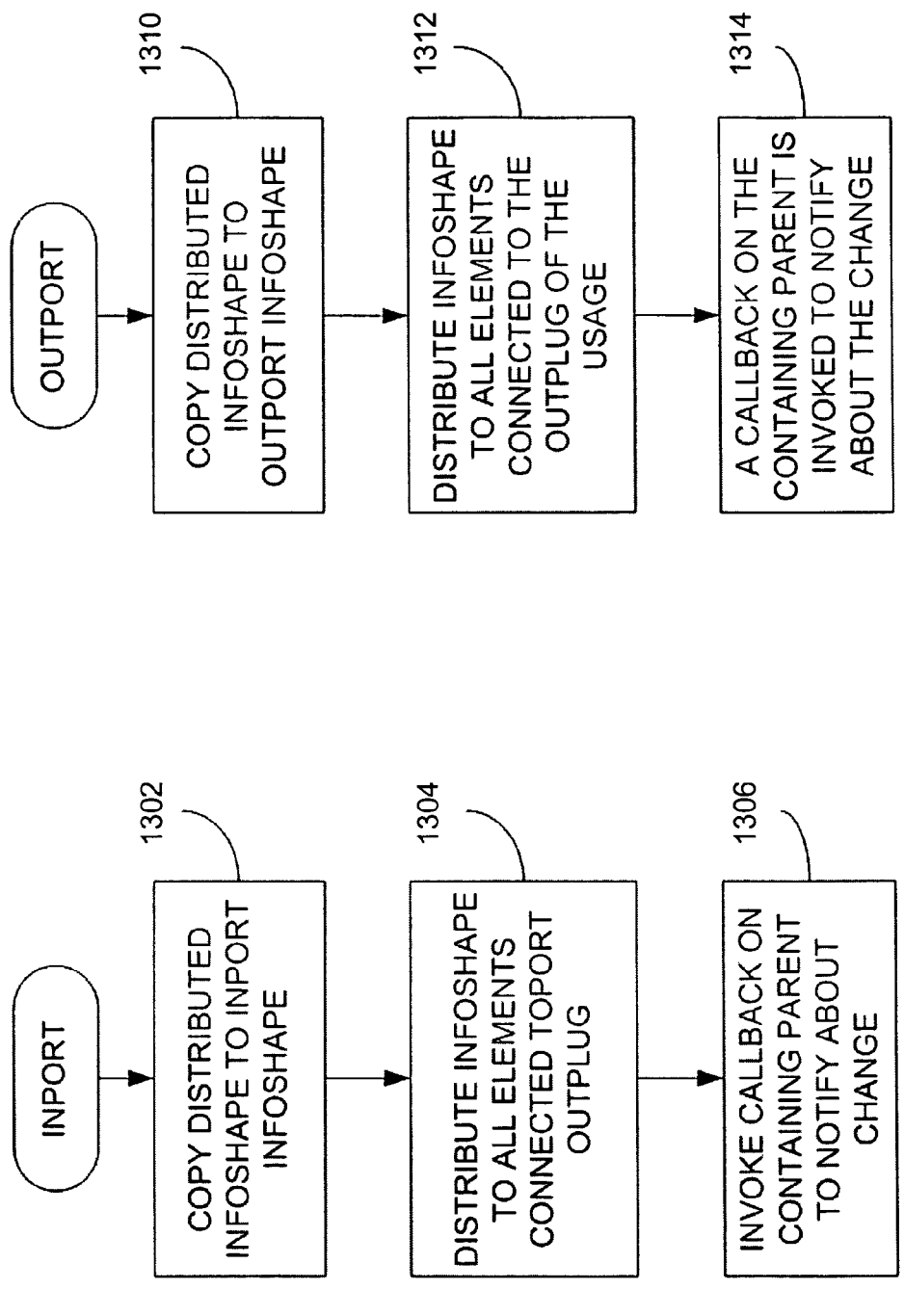
FIG. 13 is a process flow diagram illustrating an example of a method for distributing changes to application components in a design-time architecture.

One example of a method for distributing changes to the application components and application interfaces is illustrated in FIG. 13. As shown, a distribution method 1300 may operate differently for inports and outports. An import is the starting point of distribution to the current unit. In this example, a distributed infoshape may be copied to the import infoshape 1302. The distributed infoshape may be distributed to all elements that are connected to the outplug of the port 1304. A callback may be invoked on the containing parent to notify about the change 1306. An outport is a starting point for distributing to the outer units. The distributed infoshape may copied to the outport infoshape 1310. The distributed infoshape may then be distributed to all elements connected to the outplug of the usage 1312. A callback on the containing parent may be invoked to notify about the change 1314.

The above-described techniques may be implemented in digital electronic circuitry, or in computer hardware, firmware, software, or in combinations of them. The implementation may be as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program may be written in any form of programming language, including compiled or interpreted languages, and it may be deployed in any form, including as a stand alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions of the presently disclosed subject matter by operating on input data and generating output. Method steps may also be performed by, and apparatus may be implemented as, special purpose logic circuitry, e.g., an FPGA (field programmable gate array) or an ASIC (application specific integrated circuit). Modules may refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data.

Generally, a computer will also include, or be operatively coupled to receive data from and/or transfer data to, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, the above described techniques may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer (e.g., interact with a user interface element). Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

The above described techniques may be implemented in a distributed computing system that includes a back-end component, e.g., as a data server, and/or a middleware component, e.g., an application server, and/or a front-end component, e.g., a client computer having a graphical user interface and/or a Web browser through which a user may interact with an example implementation, or any combination of such back-end, middleware, or front-end components. The components of the system may be interconnected by any form or medium of digital data communication, e.g., a communication network. Examples of communication networks include a local area network ("LAN") and a wide area network ("WAN"), e.g., the Internet, and include both wired and wireless networks.

The computing system may include clients and servers. A client and server are generally remote from each other and typically interact through a communication network. The relationship of client and server arises by virtue of computer programs running on the respective computers and having a client-server relationship to each other.

The disclosed subject matter has been described in terms of particular implementations, but other implementations may be implemented and are within the scope of the following claims. For example, the operations of the disclosed subject matter may be performed in a different order and still achieve desirable results. In certain implementations, multitasking and parallel processing may be preferable. As another example, although the use of UI patterns has been described in connection with business objects and business data, patterns may be used with other types of objects and with data that is not business-related.

Patterns, including both predefined patterns and custom patterns, may also be developed using different development processes in different development environments, and executed in different run-time systems. For example, patterns may be developed using an integrated development environment (IDE) that incorporates tools for building, testing, deploying, and maintaining applications (e.g., configuration applications and pattern components). Such tools may include visual development tools, templates (e.g., code templates), and class libraries. A class library may include base classes that provide basic functionality (e.g., input/output, string manipulation, and network communication), as well as specialized classes that provide enhanced functionality (e.g., classes for building and using graphical user interfaces on clients, and for offloading application functionality onto smart clients). Where an IDE supports multiple languages, class libraries may provide a consistent development interface across those languages.

In addition, some IDEs also provide services and functionality that may be used to reduce the amount of code that needs to be written manually. Such functionality may include, for example, the ability to declare and bind to data types, and the ability to bind application elements such as controls and data structures.

IDEs may also provide code generation capabilities—for example, the ability to automatically generate plumbing code (e.g., code for drawing windows or accessing Web services), or the ability to automatically generate run-time code (e.g., by using code generators, compilers, or both). The automatic generation of run-time code allows programs to be targeted to multiple platforms. For example, a code generator may be used to automatically generate run-time code for one or more specific platforms based on the program code produced by a developer. Alternatively, the developer code may be compiled for a run-time system, which may be hosted in multiple environments (e.g., servers, clients, or a combination of servers and clients).

Some IDEs also provide the ability to create metadata that specifies descriptive information about an application, and that may be used by a run-time system to provide services to the application. Metadata may be explicitly declared by a developer, generated in the process of generating run-time code, or both.

Examples of IDEs that may be used to develop patterns include IDEs that are built using the open Eclipse Platform supported by the Eclipse Foundation (e.g., the Web Dynpro IDE developed by SAP, or the WebSphere Studio IDE developed by IBM Corp. of Armonk, N.Y.), as well as proprietary IDEs (e.g., the Visual Studio .NET IDE developed by Microsoft Corp. of Redmond, Wash.).

The overall process of developing a pattern (including, e.g., developing a configuration application and a pattern component) may include a design time aspect and a run-time aspect. The design time aspect may involve use of the IDE to write code and to declare attributes, bindings, and other metadata. The code and the metadata may then be used to generate run-time code to be executed in a run-time system. Some development environments may be coupled to a corresponding run-time system, which allows programs developed in such development environments to take advantage of services offered by the corresponding run-time systems. For example, in the Web Dynpro environment discussed in conjunction with FIG. 5, applications may take advantage of services such as input help and validation offered by the Web Dynpro runtime, which frees developers from having to code such functionality manually into their programs.

Run-time systems provide a code execution environment that generally includes core services (e.g., memory, process, and session management), as well as enhanced services (e.g., input help and validation). In addition to the Web Dynpro runtime, other examples of run-time systems include virtual machines (e.g., the Java Virtual Machine), and the Common Language Runtime (a run-time system developed by Microsoft Corp.) As specified above, run-time systems may be hosted in multiple environments, including servers and clients. Servers generally provide a core operating environment for applications (e.g., by providing a run-time system in which the applications may execute). An example of a server is a J2EE-compliant server, such as the Web Application Server from SAP or the WebSphere Application Server from IBM Corp.

What is claimed is:

1. A system comprising:
   at least one processor; and
   at least one computer-readable storage medium storing instructions that, when executed by the at least one processor, cause the at least one processor to perform operations comprising:
   generating, using a visual composer core, a display of a plurality of application components and application interfaces, each application component defining a pattern of predefined functions and having one or more assigned roles and each application interface having a set of predefined interactions between it and another of the application interfaces;
   providing, using a pattern base kit tool, common logic for the predefined functions and one or more assigned roles of each of the application components, the common logic comprising a common basis for predefined application component functions used by the application components;
   linking elements of a model of an application under development using ports that each hold an infoshape that contains data relevant to the linked elements;
   storing the application components, the application interfaces, and the ports in a repository that is accessible by the visual composer core;
   displaying a palette comprising a visual representation of the one or more assigned roles of the application components and the application interfaces;
   receiving changes to the application components and/or the application interfaces via user interaction with the palette; and
   distributing the received changes to the application components and the application interfaces by updating one or more infoshapes in the repository.

2. A system in accordance with claim 1, further comprising providing a plurality of design time services that are accessible by the visual composer core to implement roles and interfaces of the application using the application components and application interfaces.

3. A system in accordance with claim 1, wherein the palette includes a number of generic design-time extensions for the pattern base kit tool.

4. A system in accordance with claim 1, wherein the distributing also comprises propagating the changes to the pattern base kit tool.

5. A computer program product, tangibly embodied in a machine-readable storage device, the computer program product being operable to cause data processing apparatus to perform operations comprising:
   generating, using a visual composer core, a display of application components and application interfaces, each application component defining a pattern of predefined functions and having one or more assigned roles and each application interface having a set of predefined interactions between it and another of the application interfaces;
   providing, using a pattern base kit tool, common logic for the predefined functions and one or more assigned roles of each of the application components, the common logic comprising a common basis for predefined application component functions used by the application components;
   linking elements of a model of an application under development using ports that each hold an infoshape that contains data relevant to the linked elements;
   storing the application components, the application interfaces, and the ports in a repository, the repository being accessible by the visual composer core;
   displaying a palette comprising a visual representation of the one or more assigned roles of the application components and the application interfaces;
   receiving changes to the application components and/or the application interfaces via user interaction with the palette; and
   distributing the received changes to the application components and the application interfaces by updating one or more infoshapes in the repository.

6. A computer program product in accordance with claim 5, wherein the data processing apparatus performs operations comprising implementing roles and interfaces of the application using the application components and application interfaces.

7. A computer program product in accordance with claim 5, wherein the palette comprises a number of generic design-time extensions for the common logic for the predefined functions of each of the application components.

8. A computer program product in accordance with claim 5, further comprising propagating the changes to the pattern base ht tool that provides the common logic for the predefined functions of each of the application components.

9. A computer-implemented method for designing an application, the method comprising
   generating, using a visual composer core implemented on at least one processor, a display of application components and application interfaces, each application component defining a pattern of predefined functions and having one or more assigned roles and each application interface having a set of predefined interactions between it and another of the application interfaces;

providing, using a pattern base kit tool, common logic for the predefined functions and one or more assigned roles of each of the application components, the common logic comprising a common basis for predefined application component functions used by the application components;

linking elements of a model of an application under development using ports that each hold an infoshape that contains data relevant to the linked elements;

storing the application components, the application interfaces, and the ports in a repository, the repository being accessible by the visual composer core;

displaying a palette comprising a visual representation of the one or more assigned roles of the application components and the application interfaces;

receiving changes to the application components and/or the application interfaces via user interaction with the palette; and distributing the received changes to the application components and the application interfaces by updating one or more infoshapes in the repository.

10. A computer-implemented method in accordance with claim 9, further comprising implementing roles and interfaces of the application using the application components and application interfaces.

11. A computer-implemented method in accordance with claim 9, wherein the palette includes a number of generic design-time extensions for the common logic for the predefined functions of each of the application components.

* * * * *